T. W. MONAHAN.
VALVE.
APPLICATION FILED APR. 12, 1919.

1,419,290.

Patented June 13, 1922.

INVENTOR
Thomas W. Monahan
BY
ATTORNEY

UNITED STATES PATENT OFFICE.

THOMAS W. MONAHAN, OF NEW YORK, N. Y.

VALVE.

1,419,290.     Specification of Letters Patent.     Patented June 13, 1922.

Application filed April 12, 1919. Serial No. 289,712.

*To all whom it may concern:*

Be it known that I, THOMAS W. MONAHAN, a citizen of the United States, and resident of the borough of Richmond, county of Richmond, and city and State of New York, have invented certain new and useful Improvements in Valves, of which the following is a specification.

This invention relates to improvements in valves and the principal object of the invention resides in the provision of a valve having a conical plug which is formed with a deflector so arranged that the water striking the plug will be directed against the deflector and will assist in maintaining the valve in open position.

A further object of the invention is to so arrange the deflector as to prevent the water from impinging against the bonnet and upper portion of the valve plug.

Another object of the invention is to provide a valve having a relatively hard removable seat which may be readily inserted into or removed from position within the valve.

The following is what I consider a good means of carrying out this invention and the drawings should be referred to for a complete understanding of the specification which follows:—

In the drawings.

Similar reference numerals indicate like parts in all of the figures where they appear.

Figure 1:
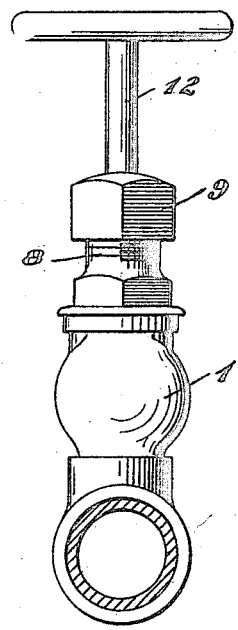
Fig. 1, is a view of this improved valve illustrating the same in use.
Figure 2:
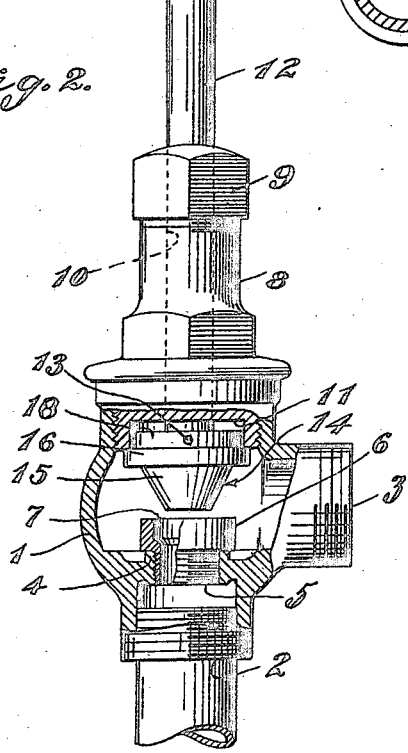
Fig. 2, is a sectional view on an enlarged scale through this valve.
Figure 3:
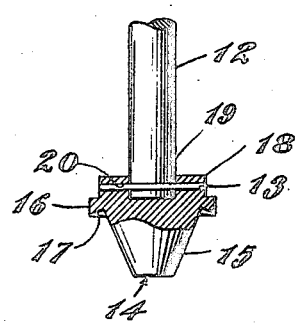
Fig. 3, is a detail view of the valve plug and stem.

Referring more particularly to the drawing, the numeral 1 designates the body of this improved valve, which is provided with the usual inlet and outlet ports 2 and 3 respectively. A partition wall 4 extends across the mouth of the inlet port and is provided with an internally threaded opening 5 for receiving the valve seat 6. As clearly illustrated in the drawing this valve seat is recessed adjacent its upper end as at 7.

The valve body 1 is provided with the usual bonnet 8 having the packing gland 9 and a longitudinally extending bore 10 which opens at its lower end into the enlarged chamber or recess 11 to accommodate the upper portion of the valve plug when the same is in open position.

Operably mounted in the longitudinal bore 10 is a valve stem 12, the upper end of which projects above the end of the bonnet and is adapted to be engaged by any suitable valve controlling element as clearly shown in Figure 1.

Adjacent the lower or inner end of the valve stem 12 is a transverse opening for the reception of a pin 13 which secures the valve plug 14 on the stem. The valve plug 14 above mentioned comprises a frusto-conical body 15, the inclined walls of which are designed to engage the valve seat 6 when the valve is closed. Formed at the larger end of said frusto-conical body 15 is a flange 16 having the face adjacent the body recessed as at 17 to form a deflector so that when the water passing upwardly against the valve plug contacts with the flange it will be directed downwardly and away from the bonnet and upper portion of the valve plug. The valve plug is so formed as to prevent said flange engaging the valve seat when the valve is closed. Formed on the plug 14 opposite the frusto-conical body 15 is a cylindrical extension 18 which is recessed as at 19 to receive the valve stem 12 and provided with a transverse aperature 20 to receive the pin 13 by means of which the valve plug is attached to the stem. It will be noted that the extension 18 is of such a diameter as to be received in the recess in the valve bonnet while the flange 16 is so designed as to engage the lower or inner end of said bonnet, so that when the valve is fully open the flange is firmly seated against the bonnet and prevents any possibility of the water contacting with the interior of the bonnet.

Other modifications may be made within the scope of the appended claims without departing from the principle or sacrificing the advantages of the invention.

What I claim is:—

1. The combination with a valve body including a bonnet, said bonnet having a bore extending therethrough and an enlarged recess at the inner end of the bore, of a hollow cylindrical valve seat threaded into the body in alinement with the bore in the bonnet, a valve stem operable through said bore, a frusto-conical plug having its reduced end arranged to enter the valve seat, a flange at the larger end of said plug, the face of said flange adjacent the inclined face of the plug being inclined outwardly at substantially right angles to the face of the plug and retained by said plug out of contact with said seat, an extension on the face of the flange opposite the plug, said extension projecting into the recess in the bonnet when the valve is open, said extension having a socket therein to receive the valve stem and means to hold said stem in said socket.

2. The combination with a valve having a seat and a bonnet with a recess in its lower end, of a plug for cooperation with the seat, said plug being frusto-conical in formation, an annular flange at the larger end of the plug for engagement with the lower edge of the bonnet and an outwardly and downwardly inclined bottom face on the flange arranged in a plane perpendicular to the wall of the plug to act as a deflector and prevent fluid flowing into the valve when open from impinging on the bonnet, said plug being so formed as to prevent said flange engaging said valve seat when the valve is closed.

Signed at the city of New York this 29th day of March, 1919.

THOMAS W. MONAHAN.